May 6, 1941.  T. G. MYERS  2,240,569
MULTIPLE SECTION MOTOR
Filed Jan. 23, 1939   3 Sheets-Sheet 3
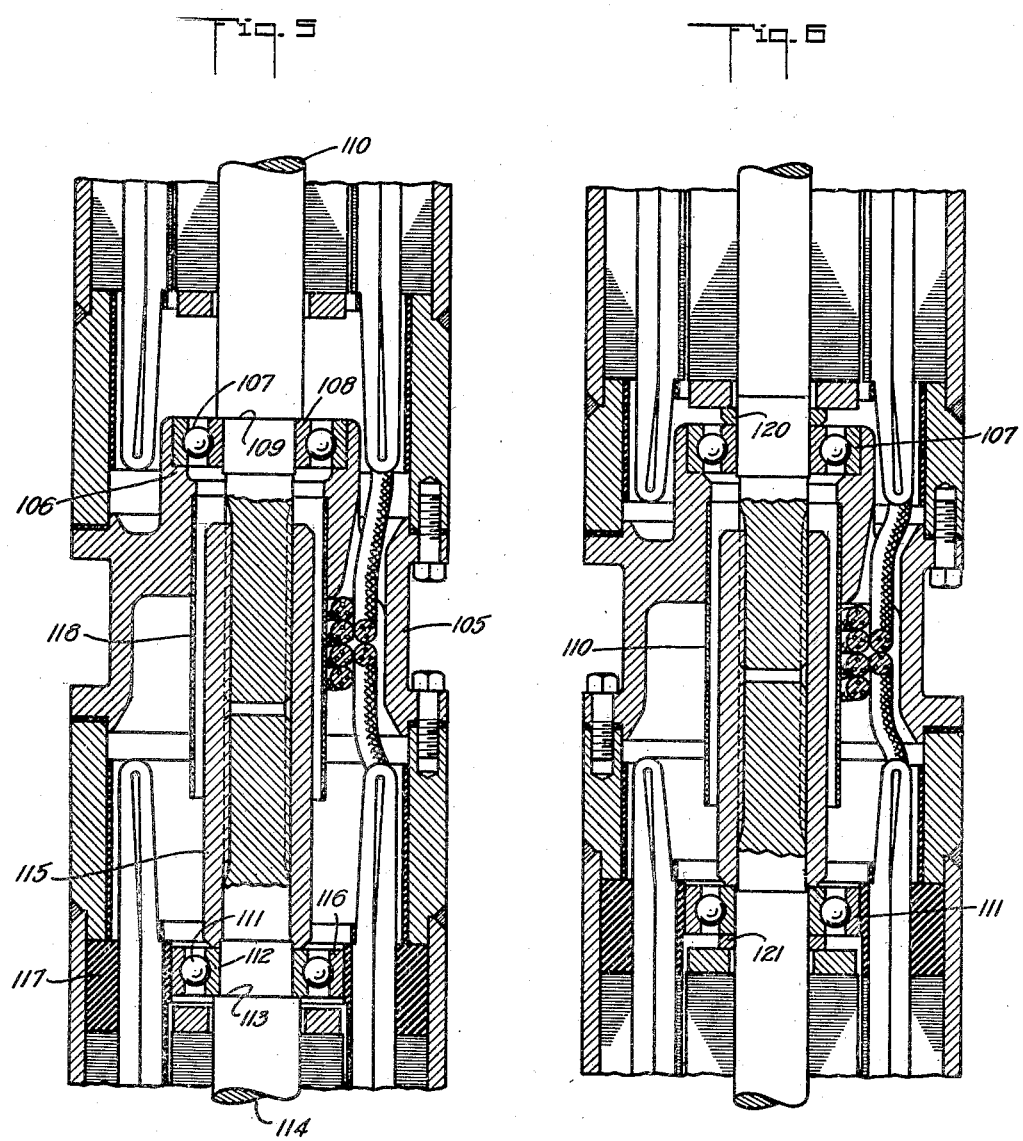

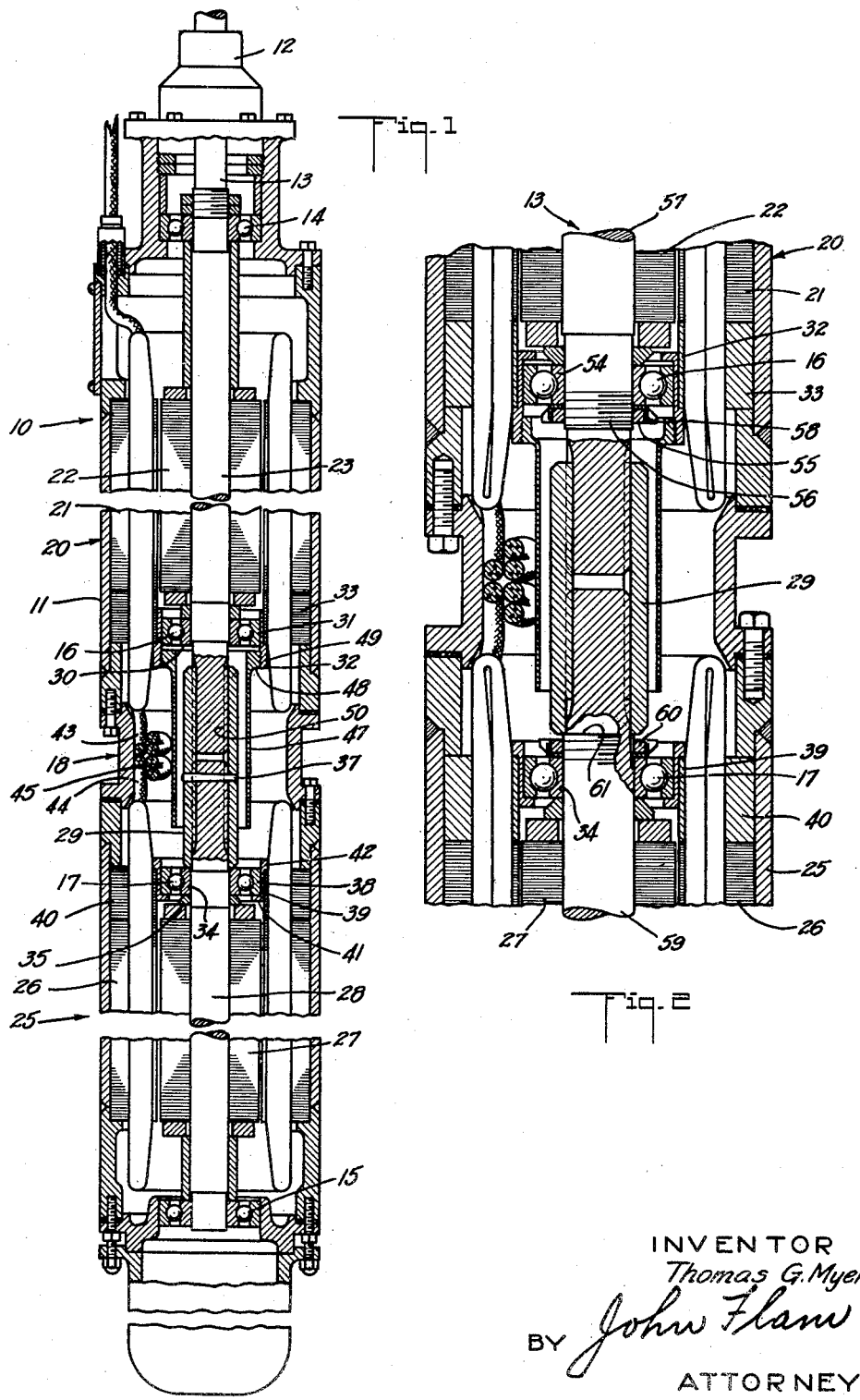

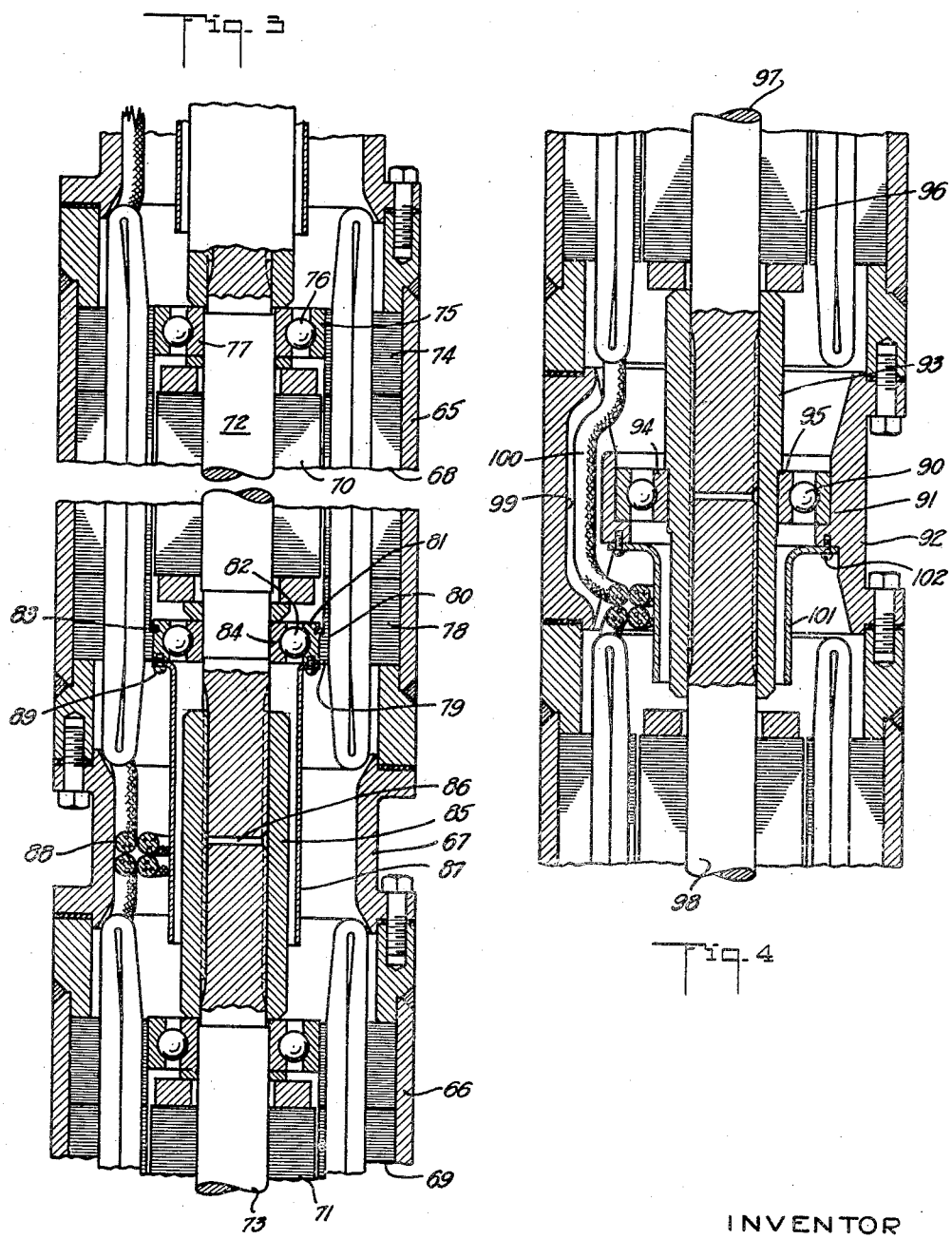

Patented May 6, 1941

2,240,569

UNITED STATES PATENT OFFICE 2,240,569

MULTIPLE SECTION MOTOR

Thomas G. Myers, Los Angeles, Calif., assignor to
U. S. Electrical Motors, Inc., Los Angeles, Calif.,
a corporation of California Application January 23, 1939, Serial No. 252,322

10 Claims. (Cl. 172—36)

This invention relates to electric motors and more particularly to submersible motors such as are used for driving deep well pumps. Such pumps must be operated near the level at which the surface of the liquid to the pumped ordinarily stands, and this frequently is as much as several hundred feet below the mouth of the well. To obviate the use of a long shaft to connect the pump to a driving motor, at the mouth of the well, a motor is sometimes used which is protected against ingress of the well liquid so that it may be closely connected to the pump and submerged along with it in the well.

Since many wells are cased with pipe of the order of eight inches or six inches in diameter, a motor of unusual design and small outside diameter is required. In order to obtain the required power with this small diameter, the length of the motor must be great, possibly of the order of twenty feet. It is to this type of motor that the present invention is directed.

It is a principal object of this invention to provide a motor of small diameter and of considerable length, having increased reliability and ease of assembly.

It is another object of this invention to provide such a motor having an improved intermediate bearing arrangement for supporting the shaft.

It is still another object of this invention to provide such a motor built up of a plurality of substantially similar sections, whereby a motor of large horsepower may be assembled from standard sections by using several sections, while a motor of lesser horsepower may be built of the same sections, by including fewer of them in its construction.

It is still another object of this invention to provide a sectional motor construction wherein the electrical connections between adjacent stator sections may be easily made as the motor is being assembled.

It is a still further object of this invention to provide a sectional motor wherein the lengths of the units comprising the several sections need not be maintained to close tolerances.

It is still a further object of this invention to provide a sectional motor wherein each section or unit includes a stator, a rotor and a shaft, the shaft being adequately supported in its associated section independently of the adjacent section.

This invention possesses many other advantages, and has other objects which may be made more easily apparent from a consideration of several embodiments of the invention. For this purpose there are shown a few forms in the drawings accompanying and forming part of the present specification. These forms, which illustrate the general principles of the invention, will now be described in detail; but it is to be understood that this detailed description is not to be taken in a limiting sense, since the scope of the invention is best defined by the appended claims.

In the drawings:

Figure 1 is a transverse section through a motor constructed in accordance with one form of the invention, the length of the motor being broken away to reduce the size of the figure;

Fig. 2 is a fragmentary section on an enlarged scale, showing a modified form of the connection between the motor sections; and Figs. 3, 4, 5 and 6 are views similar to Fig. 2, showing further modifications of the invention.

Referring to Fig. 1 of the drawings, a motor, adapted to be submerged in a well and to be directly connected to a pump, is generally indicated by 10. It includes a liquid tight casing 11 provided with a seal 12 of known type at its upper end, through which the motor shaft 13 extends for connection to the pump shaft (not shown). In this form the pump is positioned above the motor, the motor casing and the pump casing being connected together to form an assembly which is supported in the well in any preferred manner. Shaft 13 is rotatably supported with respect to the motor casing 11 by anti-friction bearings 14 and 15 adjacent its upper and lower ends respectively. These bearings may be mounted in the casing in any conventional manner, one of them, as for example the upper bearing 14, being arranged to support a thrust load as well as a radial load while the lower bearing 15 supports a radial load only. Since shaft 13 is relatively long, and the clearance of the rotor, which it supports, in the stator bore is small, it is necessary to support the shaft radially between bearings 14 and 15 to prevent lateral misalinement due to the torsional load vibration, or other causes, as by intermediate bearings 16 and 17. For convenient installation of these bearings, the motor is formed in a number of sections, adjacent sections being joined by a connector 18. Thus in Fig. 1, which illustrates a form in which there are two motor sections, the upper section 20 includes the stator 21, the rotor 22, and the shaft 23, while the lower section 25 includes a similar stator 26, a similar rotor 27, and shaft 28. The shafts 23, 28 are rotatively coupled, as by a suitable coupling sleeve 29.

One manner in which intermediate bearings 16 and 17 are supported will now be described. Thus, each bearing may be conveniently mounted in the bore of the adjacent stator. For example, the upper intermediate bearing 16 which is associated with shaft 23, may be supported axially by having its inner race 30 fitted on this shaft by a light press fit, and is supported radially by having its outer race 31 fitted in a cage 32, by a close sliding fit. The cage 32 may be conveniently supported in the bore of an extension 33 on the lower end of the upper stator 21, by being a pressed fit therein.

The lower intermediate bearing 17 has its inner race 34 secured against axial movement to its corresponding shaft section 28 as by being confined between a spacer 35 at the upper end of rotor 27 and the lower end of coupling sleeve 29. This sleeve may be provided with a plurality of splines 50 which cooperate with splines formed on the shafts 23 and 28, so that relative rotation between the shafts is prevented, but the shafts are free to move axially with respect to each other. However, the sleeve 29 is secured against axial movement on shaft 28 in any convenient way as by a taper pin 37. The outer race 38 of bearing 17 is restrained radially by being a close fit in the bore of a cage 39, this cage in turn being mounted in the bore of an extension 40 at the upper end of the lower stator 26. Bearing 17 is also supported in cage 39 by means of an inwardly extending shoulder 41 at the lower end of the bore of the cage. The cage 39 is supported in extension 40 by means of outwardly projecting flange 42 at the upper end of the cage.

The stator extensions 33 and 40 are preferably formed of non-magnetic material, so as to reduce losses, since they extend beyond their respective rotors; they may be formed of brass or stainless steel laminations, or of a single piece of brass, or Bakelite or similar material, the configuration in either case agreeing with the stator laminations to permit installation of the stator windings.

The shaft 23 of the upper motor section 20 is axially supported by bearing 14 at the upper end of the motor casing. The details of this bearing support may take any of various forms, all well known to those familiar with the art. Hence, the intermediate bearing 16 at the lower end of motor section 20 is only required to guide the lower end of shaft 23 radially. Thus, since the coupling sleeve 29 is splined to the lower end of shaft 23, the intermediate bearing 17 at the upper end of the lower motor section 25 must axially support the lower shaft section 28, while the lower bearing as 15 of motor section 25 supports only a radial load.

Thus, each of shaft sections 23 and 28 is independently supported in its associated casing section, which greatly facilitates the assembly of the complete motor. With the lower rotor in place in its casing, the coupling sleeve 29 is ready to slip over the lower end of shaft 23. The connecting member 18 is secured to either the upper or lower casing section as convenience dictates. A short section 43 of suitable connecting cable has been joined to the lower end of the upper stator 21 at some convenient time previously, and another section 44 of cable has been similarly connected to the upper end of the lower stator 26. These sections 43, 44 of cable are of such length that joints between the free ends of their conductors may be conveniently made. After the joint is made, the surplus length of cable is bent and folded within member 18 as indicated at 45, the end of shaft 23 is inserted in splined sleeve 29, and the other casing section is joined to the coupling member 18.

To protect this cable from the rapidly rotating coupling 29, a stationary sleeve 47 is provided, which surrounds the coupling. The sleeve 47 may be conveniently supported by having its upper end 48 threadedly engage an extension 49 on bearing cage 32.

Brief consideration will show that the motor structure is not limited to two sections as shown, but that one or more intermediate sections, each having its lower end arranged as the lower end of section 20 and its upper end arranged as the upper end of section 25 may be interposed between sections 20 and 25 by providing additional coupling members 18 and sleeve 29, as well as cable connections 43 and 44.

Fig. 2 illustrates a modification of the intermediate bearing arrangement shown in Fig. 1, wherein the bearings are secured on their respective shafts by nuts. Thus the bearings 16 and 17 are mounted in cages 32 and 39 supported in extensions 33 and 40 of the stators 21 and 26, as before. The inside race 54 of the top bearing 16 however is clamped against the end of rotor 22 by a nut 55 engaging threads 56 on the lower end of the upper section 57 of the shaft 13. The nut 55 is held against loosening by a known type of nut-lock 58.

Similarly, the inside race 34 of bearing 17 is secured to the lower section 59 of the motor shaft by nut 60, and supports the weight of this shaft section and its rotor, as before. It is not necessary to join the splined coupling 29 to the shaft in this form, the sleeve being freely slidable on both sections of the shaft and being supported in position by shoulder 61 on the lower shaft section 59.

It may be desirable to support the rotor sections by the lower bearings of each motor section. Such an arrangement is illustrated in Fig. 3, which also illustrates an intermediate motor section, such as would be used in a motor having three or more sections. In this form of the invention, casing sections 65 and 66, joined by a connector 67, each inclose stator sections 68 and 69, respectively cooperating with rotor sections 70 and 71, on shaft sections 72, 73 all as before. To provide a support for the intermediate bearing the stator section 68 has an extension 74 of non-magnetic material, as brass or stainless steel, at its upper end. The bore of this extension serves to radially support the outer race 75 of a ball bearing 76, the inner race 77 of which is mounted on the upper end of shaft 72. The lower end of stator 68 has an extension 78 of similar non-magnetic material. The bore of this extension has its lower portion 79 of reduced diameter to form an upwardly directed shoulder 80. The outer race 81 of ball bearing 82 closely fits the reduced bore 79, and is supported on shoulder 80 as by a snap ring 83 accommodated in a groove in the race 81. The inner race 84 of bearing 82 is pressed on shaft 72, against the bottom of rotor 70, so that when the shaft and bearings are in place in the stator, the lower bearing 82 supports the rotor section, while the upper bearing 76 guides it radially but is free to move in an axial direction.

Shaft sections 72 and 73 are joined by a splined connecting member 85. There is clearance 86 between adjacent ends of the shafts whereby each shaft section is independently supported in its associated casing section. A stationary sleeve 87 surrounds the rotating connecting member 85 to protect the leads 88 which connect the stators. This sleeve may be conveniently supported from the outer bearing race 81, as by machine screws 89.

It is not necessary that there be a pair of intermediate bearings between the sections. Thus, in Fig. 4, a single bearing 90 is used for this purpose. This bearing is supported axially as well as radially, in a cage 91 formed integrally with the member 92 which connects the casing sections. The splined coupling 93 which connects the shaft sections has the inside race 94 of bearing 90 mounted on it, and has a downwardly directed shoulder 95 which rests on the inside race 94. The upper end of coupling 93 engages the bottom of the upper rotor 96, whereby this, together with its shaft 97, are axially supported. A passageway 99 past the bearing cage is provided for the stator connections 100. A stationary sleeve 101 supported from the bearing cage 91 by screws 102, serves to protect the connections from the rotating coupling 93. The upper end of the lower shaft 98 serves to guide this end radially only. The opposite ends of shafts 97, 98 may be supported in a similar manner by a single bearing, or in some of the other previously described ways, as desired.

Fig. 5 illustrates a further modification of the intermediate bearing structures. In this form the connecting member 105 which joins the casing sections has a bearing cage 106 formed integrally at its upper end for supporting bearing 107. The inner race 108 of this bearing is engaged by a downwardly directed shoulder 109 formed on the upwardly extending shaft section 110 so as to support this shaft and its attached rotor axially as well as to guide this end of the shaft radially. A similar bearing 111 has its inner race 112 supported on an upwardly directed shoulder 113 formed near the upper end of the downwardly extending shaft 114; and the splined coupling sleeve 115 in turn being supported on bearing race 112. The outside race 116 of this bearing 111 is slidably supported in the bore of a non-magnetic extension 117 of the lower stator, so that bearing 111 serves only to radially support the shaft 114. A stationary sleeve 118 surrounds the coupling as in the other forms.

It is not necessary to provide shoulders on the shafts to engage the bearings. Thus, Fig. 6 shows a structure substantially identical with that of Fig. 5 except that the bearings 107 and 111 are shouldered against the adjacent end of the respective rotors by spacer rings 120 and 121. This form also includes a protective sleeve 119 to protect the leads between the stators from being rubbed by the rotating coupling.

By providing a shaft assembly divided into sections with joints corresponding to the joints between the casing sections, and supporting each shaft section in its corresponding casing section, the assembly of the motor is greatly simplified.

Thus, any of the modified forms of the motor can be assembled by following the procedure described in assembling the first form.

What is claimed is:

1. In a sectional electric motor, at least a pair of motor units, each unit including a stator winding, as well as an annular stator structure cooperating with the winding, and also a casing by the aid of which the stator structure is supported, there being a shaft for each unit, means connecting the units, means coupling the shafts, and a bearing structure in each unit for supporting the associated shaft, said structure being mounted within the annular stator structure.

2. In a sectional electric motor, at least a pair of motor units, each unit including a casing, a stator with windings, and a shaft rotatably supported in the casing, a member connecting the casings, a cable electrically connecting the stator windings within the connecting member, and a stationary sleeve surrounding the shaft to protect the cable from the shaft.

3. In a sectional electric motor, at least a pair of motor units, each unit including: a stator structure having a stator with bore, a shaft, and a casing; means connecting the casings of the units, means coupling the shafts, a bearing structure for supporting the shaft, means forming an extension of the stator bore, and means forming a bearing cage mounted in said extension for supporting the bearing structure.

4. In a sectional electric motor, at least a pair of motor units, each unit including a casing and a shaft, means connecting the units, a splined coupling member joining the shafts to prevent relative rotation between the shafts, means securing said coupling member against axial movement with respect to one of said shafts, whereby the end of the coupling member forms a shoulder, a bearing structure upon which said shoulder rests, and means to support the bearing structure in the casing.

5. In a sectional electric motor, at least a pair of motor units, each unit including a casing and a shaft, means connecting the units, a splined coupling member joining the shafts to prevent relative rotation between the shafts, means securing said coupling member against axial movement with respect to one of said shafts, whereby the end of the coupling member forms a shoulder, a bearing cage supported within the casing and having means forming a shoulder oppositely directed to the shoulder on the end of the coupling member, and a bearing structure interposed between said shoulders.

6. In a sectional electric motor, at least a pair of motor units, each unit including: an annular stator structure including a stator, and a shaft, and a casing for supporting the stator structure; means connecting the casings of the units, a coupling member joining the shafts to prevent relative rotation therebetween, means forming a shoulder on one of said shafts, a bearing structure mounted within the stator and engaging said shoulder, and means forming a shoulder in said stator and engaged by said bearing structure.

7. In a sectional electric motor, at least a pair of motor units, each unit including an annular stator and a shaft, means connecting the units, a coupling member joining the shafts to prevent relative rotation therebetween, a bearing structure for rotatably supporting the shaft mounted adjacent each end of the shaft, at least one of said structures being mounted within the stator, means whereby one of said bearings is restrained against axial movement with respect to said shaft in at least one direction, means so supporting said one bearing as to resist axial movement of the shaft in said direction, the other bearing being free to move axially in its support.

8. In a vertical electric motor having a casing, a shaft, a rotor on the shaft, and an annular stator structure including a stator, said structure being supported by the casing, a rolling bearing structure on the shaft adjacent each end of the rotor, each of said bearing structures being radially supported by and within the stator structure, and means to support one of said bearing structures axially in said stator, comprising means forming a shoulder in said stator, and a snap ring carried by said structure engaging the shoulder.

9. In a sectional electric motor, at least a pair of motor units, each unit including a casing section, an annular stator structure, and a shaft section, a connecting member between the casing section and coupling means between the shaft sections, means forming a shoulder on said shaft adjacent the coupling means, a bearing structure engaging said shoulder for rotatably supporting one of the shaft sections, means forming a cage in the connecting member for supporting said bearing structure, and a second bearing structure adjacent the coupling member for rotatably supporting the other shaft section, said second bearing structure being supported by and within the stator structure.

10. In a multiple section electric motor, in which each section includes a casing, a rotor, a shaft, and an annular stator structure surrounding the rotor, and supported by the casing; means for connecting adjacent ends of the casing together, coupling means between adjacent shaft ends, and bearing structures respectively for the adjacent shaft ends, at least one of said structures being supported by and within the corresponding stator structure.

THOMAS G. MYERS.